United States Patent [19]

Loder

[11] Patent Number: 5,748,720
[45] Date of Patent: May 5, 1998

[54] REMOVABLE SUBSCRIBER IDENTIFICATION MODULE FOR A MOBILE RADIO TERMINAL

[75] Inventor: John Andrew Loder, East Parramatta, Australia

[73] Assignee: Nokia Telecommunications Oy, Espoo, Finland

[21] Appl. No.: 693,570

[22] Filed: Aug. 7, 1996

Related U.S. Application Data

[60] Continuation of Ser. No. 460,189, Jun. 2, 1995, which is a division of Ser. No. 224,572, Apr. 7, 1994.

[51] Int. Cl.$^6$ .................. H04M 15/00; H04M 17/00; H04M 11/00
[52] U.S. Cl. .................. 379/144; 379/113; 379/114; 455/406; 455/407
[58] Field of Search .................. 379/112, 113, 379/114, 58, 59, 91, 96, 130, 131, 144; 455/406, 407, 410, 414, 458

[56] References Cited

U.S. PATENT DOCUMENTS

| | | | |
|---|---|---|---|
| 4,776,000 | 10/1988 | Parienti | 379/144 |
| 4,776,003 | 10/1988 | Harris | 379/91 |
| 5,068,891 | 11/1991 | Marshall | 379/144 |
| 5,134,717 | 7/1992 | Sogaard Rasmussen | 379/354 |
| 5,138,650 | 8/1992 | Stahl et al. | 379/91 |
| 5,265,155 | 11/1993 | Castro | 379/144 |
| 5,266,782 | 11/1993 | Alanara et al. | 379/144 |
| 5,272,747 | 12/1993 | Meads | 379/144 |
| 5,371,493 | 12/1994 | Sharpe et al. | 379/57 |
| 5,509,056 | 4/1996 | Ericsson | 379/114 |
| 5,550,897 | 8/1996 | Seiderman | 379/59 |
| 5,557,664 | 9/1996 | Burns | 379/112 |

*Primary Examiner*—Curtis Kuntz
*Assistant Examiner*—Vijay Shankar
*Attorney, Agent, or Firm*—Cushman Darby & Cushman IP Group of Pillsbury Madison & Sutro LLP.

[57] ABSTRACT

An ability to hold a record of amount of funds prepaid for at the point of the sale is incorporated within a subscriber identity module (or "SIM") of a mobile radio terminal. This payment record will progressively decrease as services of the network are used according to tarif rate which is either preprogrammed in to the SIM or sent by the network. The SIM monitors the remaining value of the payment and, when the value of the payment reaches a predetermined minimum value, prevents further calls. This blocking of the mobile station may be effected by a specific blocking command outputted to a mobile equipment part of the mobile station, or by disabling network operation functions, such as authentication algorithms, in the SIM, or by not sendind a specific acknowledgement to the network.

6 Claims, 6 Drawing Sheets

REMOVABLE SUBSCRIBER IDENTIFICATION MODULE FOR A MOBILE RADIO TERMINAL

This is a continuation of application Ser. No. 08/460,189, filed on Jun. 2, 1995 (abandoned upon the filing hereof), which is a divisional application of pending application Ser. No. 08/224,572, filed Apr. 7, 1994.

FIELD OF THE INVENTION

The invention relates to a removable data storage module which contain data permanently related to an identification and authentication of a subscriber of a mobile radio terminal. The invention also relates to a call control method utilizing such a data module.

BACKGROUND OF THE INVENTION

The specifications of GSM, the European Digital Cellular System for Land Mobile Radio Communications, defines that all the information elements needed by the radio system to identify, authenticate and locate a mobile subscriber will be contained into a dedicated module, called a SIM (Subscriber Identity Module), which is removable and allows the use of different mobile stations. The remaining part of the mobile station, called a mobile equipment (ME), is intended to contain all the mechanisms and devices which are needed to access the GSM services (for instance the radio equipments) but are not specific to a given subsriber. Further, the SIM is removable from the mobile equipment and the intervals between subscriber identity module and mobile equipment is standardized in ETSI specification GSM 11.11. This interface is in accordance with ISO standards on IC cards (SIO 7816) The SIM may be a part of the multi service card, of which GSM mobile telecommunication is one of the applications. These features allow the mobile equipment to be a universal equipment operable by different mobile subscribers in turn, each using his own SIM. The SIM can be either a smart card which has the well-known size of credit cards, or alternatively it can be in a much smaller format, called a "plug-in SIM". The latter format is more suitable for handportable terminal equipments.

The SIM enables access to the service of the radio system. The charging of calls and other services of the radio system is performed by the radio network. Data for each chargeable service used by a mobile subscriber are recorded on his or her account in a data base of the home network. The accumulated charges are periodically billed afterwards from the mobile subscriber. During the use of the mobile terminal, a specific advice of charge information, called "e" parameters, can be sent to the mobile station MS and shown on the display of the MS.

The above-described charging method is practical for most of the mobile subscribers. It is even possible that a mobile subscriber has only a personal subscriber identity module SIM and rents the remaining part of the mobile station, ie. the mobile equipment, when needed. This transferring of the SIM instead of the entire mobile station MS and using different mobile equipment ME is sometimes called a "SIM roaming". In all cases the network addresses the charges of the connections and services to the SIM owner. However, there are customers who wish to use a radio system temporarily and on short notice, without any need to a longer subscribership in the system. Such temporary customers include, for example tourists or business persons travelling abroad in remote locations. Also, the normal SIM roaming may be difficult because there may not be roaming agreements between different network operators on the charging and billing of the services. A SIM which is valid in one network, may therefore not be valid in another network. Further, although the SIM roaming from one network to another would be possible, the charging rate of the new country may be unknown and it will be therefore difficult to estimate the actual connection fees. Thus, there is a need for allowing an easy and immediate access to a radio network for potential but temporary customers.

SUMMARY OF THE INVENTION

An object of the invention is to allow an access to a radio system without need for a subscribership and extensive credit checking and billing operations in the network.

According to the invention, a removable subscriber identification module for a mobile radio terminal, includes electrically alterable memory means for storing data permanently related to an identification and authentication of a mobile subscriber, means for interfacing and communication with the mobile radio terminal, is characterized by memory means for storing a record of the amount of funds prepaid for future charges, means for decreasing the amount of prepaid funds according to a charging information received from a mobile radio network via said mobile radio terminal, means for blocking further transmissions of the mobile radio terminal in response to the amount of funds reaching a predetermined minimum value.

The present invention further provides a removable subscriber identification module for a mobile radio terminal, including electrically alterable memory means for storing data permanently related to an identification and authentication of a mobile subscriber, means for interfacing and communication with the mobile radio terminal, is characterized by memory means for storing a record of the amount of funds prepaid for future charges, means for decreasing the amount of prepaid funds during use of services of a mobile radio network according to a charging information stored in the subscriber identification module, means for blocking further transmissions of the mobile radio terminal in response to the amount of funds reaching a predetermined minimum value.

The present invention further provides, in a mobile radio system comprising a network and mobile radio terminals, each of the mobile radio terminals having means for accommondating a removable subscriber identification module which stores data permanently related to an identification and authentication of a mobile subscriber, a call control method, including steps of the network sends a message containing charging information and requesting a mobile radio terminal to send an acknowledgement, the mobile radio terminal receives the message, the subscriber identification module checks a value of prepaid funds stored in the subscriber identification module, the subscriber identification module prevents sending of said acknowledgement in response to the checking when the said value of prepaid funds are insufficient for a call.

the subscriber identification module allows sending of the acknoledgement in response to the checking when the value of prepaid funds are sufficient for a call, the network continues the call in response to receiving the acknowledgement, said network interrupts said call in response to not receiving the acknowledgement.

A further concept according to the present invention is to provide, in a mobile radio system including a network and mobile radio terminals, each of the mobile radio terminals having means for accommondating a removable subscriber identification module which stores data permanently related to an identification and authentication of a mobile subscriber, a call control method, including the steps of initiating a call set procedure, the subscriber identification module checks a value of prepaid funds stored in the subscriber identification module, the subscriber identification module disables the execution of the call setup procedure in the mobile radio terminal in response to the checking when the value of prepaid funds are insufficient for a call, the subscriber identification module allows the execution of the call setup procedure in response to the checking when the value of prepaid funds is sufficient for a call.

According to the invention, an ability to hold a record of amount of funds prepaid for at the point of the sale is incorporated within a subscriber identity module, SIM. This prepaid amount will ultimately go back to the network operator. This payment record will progressively degrease as services of the network are used according to tarif rate which is either preprogrammed into the SIM or sent by the network. This payment record may also be displayed on the mobile equipment. The SIM monitors the remaining value of the payment and, when the value of the payment reaches a predetermined minimum value, prevents further outgoing (mobile originating) or incoming (mobile terminating) calls from or to the mobile station, respectively. This blocking of the mobile station may be affected by a specific blocking command outputted to a mobile equipment part of the mobile station, or by disabling network operation functions, such as authentication algorithms, in the SIM. In one embodiment of the invention, the network transmits charging information messages and requires an acknowledgement from the mobile station. Upon receiving the charging information message, the SIM checks the remaining value of the payment and prevents the transmission of the acknowledgement in response to the value not being sufficient for the call. Not receiving the acknowledgement within a preset time, the network terminates the ongoing call or set-up procedure. If the remaining value of the payment is sufficient for a call, the acknowledgement will be transmitted, and the the call set-up procedure or the call will be continued normally. The subscriber data in the data bases of the network may contain an indication that the subscriber is a prepaid SIM subscriber and that the acknowledgment of the charging information message is required.

Normally, a calling subsciber is responsible for all of the cost of an outgoing call. However, in some radio systems, a portion or all of the call costs may be addressed to a called party for receiving the incoming call. The present invention may be utilized in charging either an incoming call or an outgoing call.

The user of the prepaid SIM of the present invention has not been processed or registered on the network operators billing data bases, but still has an access to a network because of having prepaid for all call charges. Hence, details of address and credit worthiness of the user are not needed. As a result, the network operator gains short term customers without extensive credit checking and billing operations. Difficulty in obtaining roaming agreement between different network operators will not stop the universality of the global radio system, as GSM, since prepaid SIMs could be available with rental mobile equipments to give travellers immediate access to the new country's network. The invention also allows the SIM holders to know their spending limit, especially when in a new country with unknown charging rates. The invention also allows tourists to hire a mobile phone and a prepaid SIM in very little time and in more remote locations.

BRIEF DESCRIPTION OF THE DRAWINGS

The preferred embodiments of the invention will be described with reference to the attached drawings wherein.

DETAILED DESCRIPTION OF PREFERRED EMBODIMENTS OF THE INVENTION

The present invention is applicable to all mobile radio systems utilizing subscriber identity modules, SIMs. The present invention is particularly advantaged when applied in the pan-European digital mobile radio system GSM, or in the modification thereof, DCS1800. In the following, the preferred embodiment of the invention will be described as an application in a GSM system, to which the invention, however, is not intended to be limited.

Figure 1:
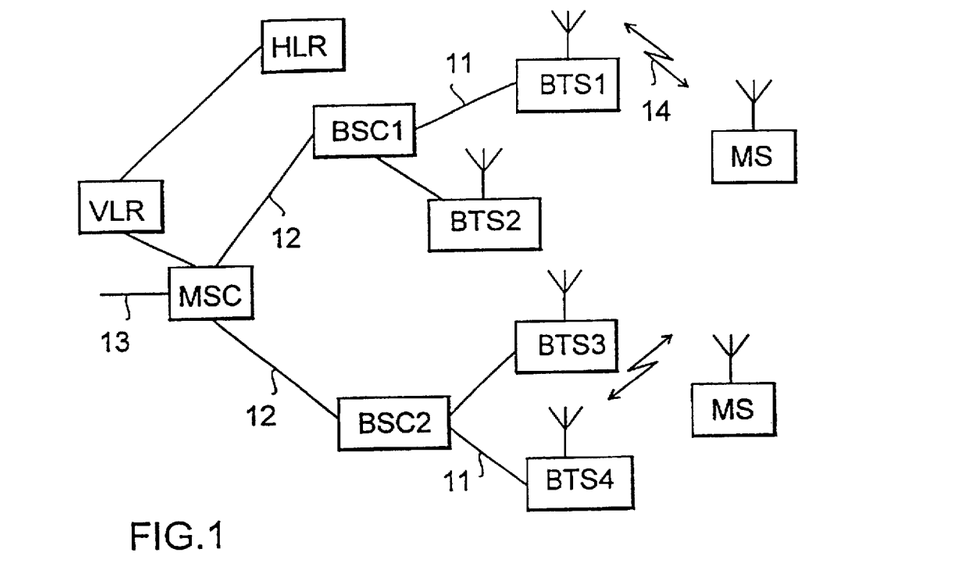
FIG. 1 is a block diagram illustrating a cellular mobile radio system.

FIG. 1 shows schematically a portion of a GSM cellular radio system. In the cellular radio system the area covered by the system is divided into radio cells. Base station controllers BSC1 and BSC2 are connected by digital transmission links 12 to a mobile exchange MSC. Furthermore, base stations BTS1, BTS2 and BTS3, BTS4 are connected by digital transmission links 11 to the base station controllers BSC1 and BSC2, respectively. Each BSC and the base stations BST controlled by it form a base station system, BSS. The radio coverage area of a single base station BTS typically creates a single radio cell. Each base station BTS1 to BTS4 has a predetermined fixed number of physical radio channels. The configuration and properties of the GSM system, are described in more detail in the GSM specifications and in the book "The GSM System for Mobile Communications, M. Mouly & M. B. Bautet, Balaiseau, France, 1992, ISBN:2-9507190-0-7, which are heraby incorporated by reference.

Subscriber data, such as location date, are stored permanently in a home location register (HLR). The HLR also has an associated authentication center (not showen), which may be integrated or separate. The authentication center contains subscriber authentication data and authentication algorithms. The system also comprises several visitor location registers (VLR) each associated with one or more MSC areas. The VLR is a data base in which subscriber data are stored while the mobile station MS is visiting the area of the MSC.

According to the GSM specifications, all the information elements contained in a MS which are related to a mobile subscriber must be stored and operated within a specific module, called a subscriber identity module, SIM. The remaining part of the MS, called a mobile equipment, ME, contains the hardware and software specific to the radio interface. Specification GSM 2.17 specifies the operation of a SIM, and specification GSM 11.11 specifies the instruction format and encoding in the SIM as well as the interface between the SIM and the ME. The SIM can be a smart card, an IC card SIM, the interface of which with the outside world is in accordance with ISO standards on IC cards, i.e., ISO 7816 series. The IC card SIM of a standard size may be too large for hand-portable radios, and therefore, also a plug-in SIM which is a dedicated module fully standardized within the GSM system and intended to be semipermanently installed in the ME can be used.

In the GSM system, the identification of a mobile subscriber is based on the SIM card. The mobile subscriber is able to use different mobile equipment, ME, but is all the time using the same SIM card and thereby can be reached by the same subscriber number. Without the SIM card, only emergency calls can be made by the ME. When used in the ME, the SIM shall provide, when it is in GSM network operation, a storage of subscriber-related security information (according to recommendations GSM 02.09), e.g. temporary mobile subscriber identity TMSI, and a key Ki, and an implementation of authentication and cipher key generation mechanisms according to recommendation GSM 03.20 (i.e. algoritms A3 and A8). For the user's own security, the SIM must handle a 1 digit PIN code (Personal identification number). Furthermore, the SIM storage capability may provide facilities to memorise and manage additional information elements related to the mobile subscriber in association with GSM services and MS features.

According to the present invention, an ability to hold a record of the amount of funds prepaid for at the point of sale is incorporated within the SIM. The amount of the prepaid funds is gradually decreased during the use of the services of the radio system, and further calls are prevented. For example, in a GSM system, an existing SIM is modified so that it comprises within its security an electrically alterable memory location. This may be implemented e.g., in an EEPROM or FLASH memory circuit. This memory circuit can then have a number representing the amount of prepaid funds programmed into it via a programming device. The programming may be performed at the point of sale location or during manufacture. A SIM card may be reprogrammable (reusable) or one time programmable (disposable).

Figure 2:
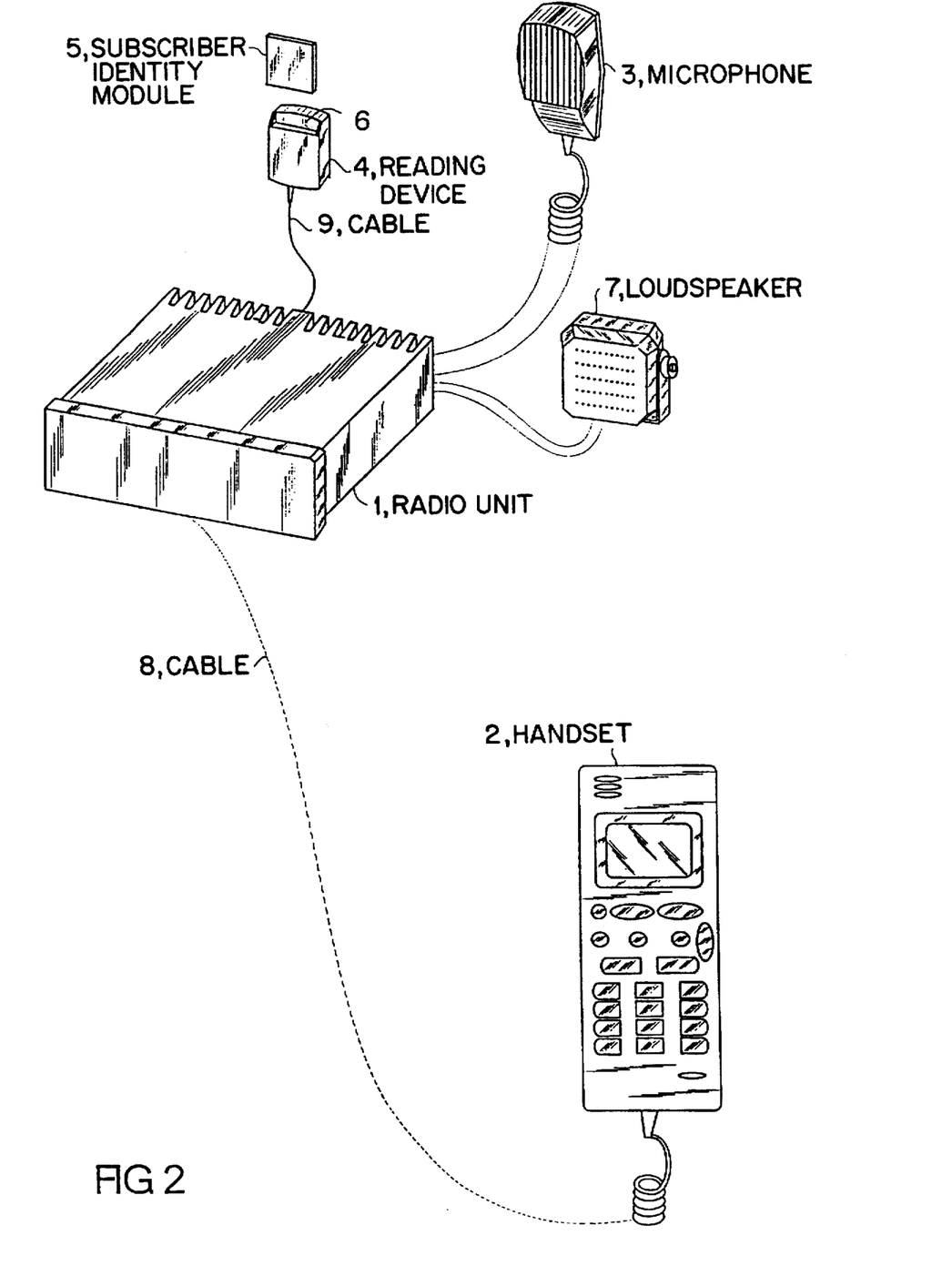
FIG. 2 shows a vehicle mounted mobile station.

The present invention may be applied in a mobile radio system to any type of mobile radio station, MS, e.g., a portable mobile phone or a vehicle-mounted station with an ability of using a removable memory. FIG. 2 shows, as an example of an mobile radio station, a radio telephone unit which can be mounted in a vehicle. The mobile station MS of FIG. 2 comprises a radio unit 1, which is connected by a cable 8 to a handset 2. The handset 2 includes normal components and functions: microphone, loudspeaker, and a user interface formed by a display and a keypad. In order to allow a handsfree operation, the radio unit 1 may also be connected to a separate microphone 3 and separate loudspeaker 7. Further, a separate reading device 4 for memory card or memory module 5, referred to a subscriber identity module SIM herein, is connected to a radio unit 1 via a cable 9. A reading device 4 includes a card slot 6, in which a SIM card 5 can be inserted in a reading device 4 in a such way that it can later be easily removed or detached. One example of a vehicle-mounted mobile station is Nokia GSM carphone model 6050 manufactured by Nokia Mobile Phones Inc. of a Finland. The mobile stations may also be a portable terminal wherein the card reading device, the radio sections and the handset are integrated into one piece. One example of such portable mobile station is Nokia 101GSM manufactured by Nokia Mobile Phones Inc., Finland.

Figure 3:
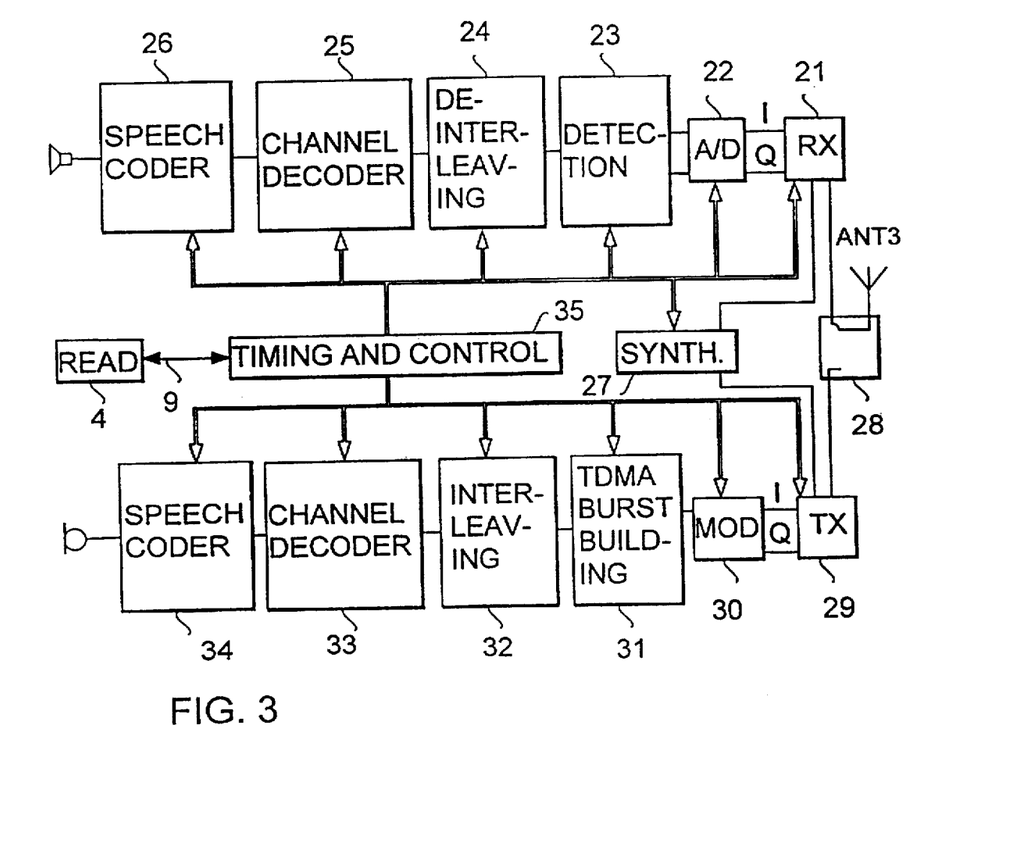
FIG. 3 is a block diagram of a mobile station consisting of a mobile equipment ME, and a subscriber identity module, SIM.

FIG. 3 shows a block diagram of a mobile equipment part ME of a mobile station MS. The ME comprises an antenna 3, a duplex filter 28, a receiver 21, a transmitter 29 and a synthesizer 27. In a receiving direction, a series connection of an A/D converter 22, a detector 23, a di-interleaving means 24, a channel decoder 25, speech decoder 26 and a loud speaker are connected subsequent to receiver 21. In a transmitting direction, a series connection of a microphone, a speech coder 34, a channel coder 33, an interleaving unit 32, a TDMA burst building unit 31 and a modulator 30 are connected prior to the transmitter 29. All the abovementioned blocks are controlled by a timing and control unit 35, which processes all outbound and inbound messages. The timing and control unit 35 is further connected to a SIM card-reading device 4 via cable 9.

The use and the operation of the SIM card according to the invention is similar to the prior SIM cards, except that automatic charging and call blocking functions are introduced. The operation of the prepaid SIM card when placed into the mobile equipment ME is now described with reference to the FIG. 4.

Figure 4:
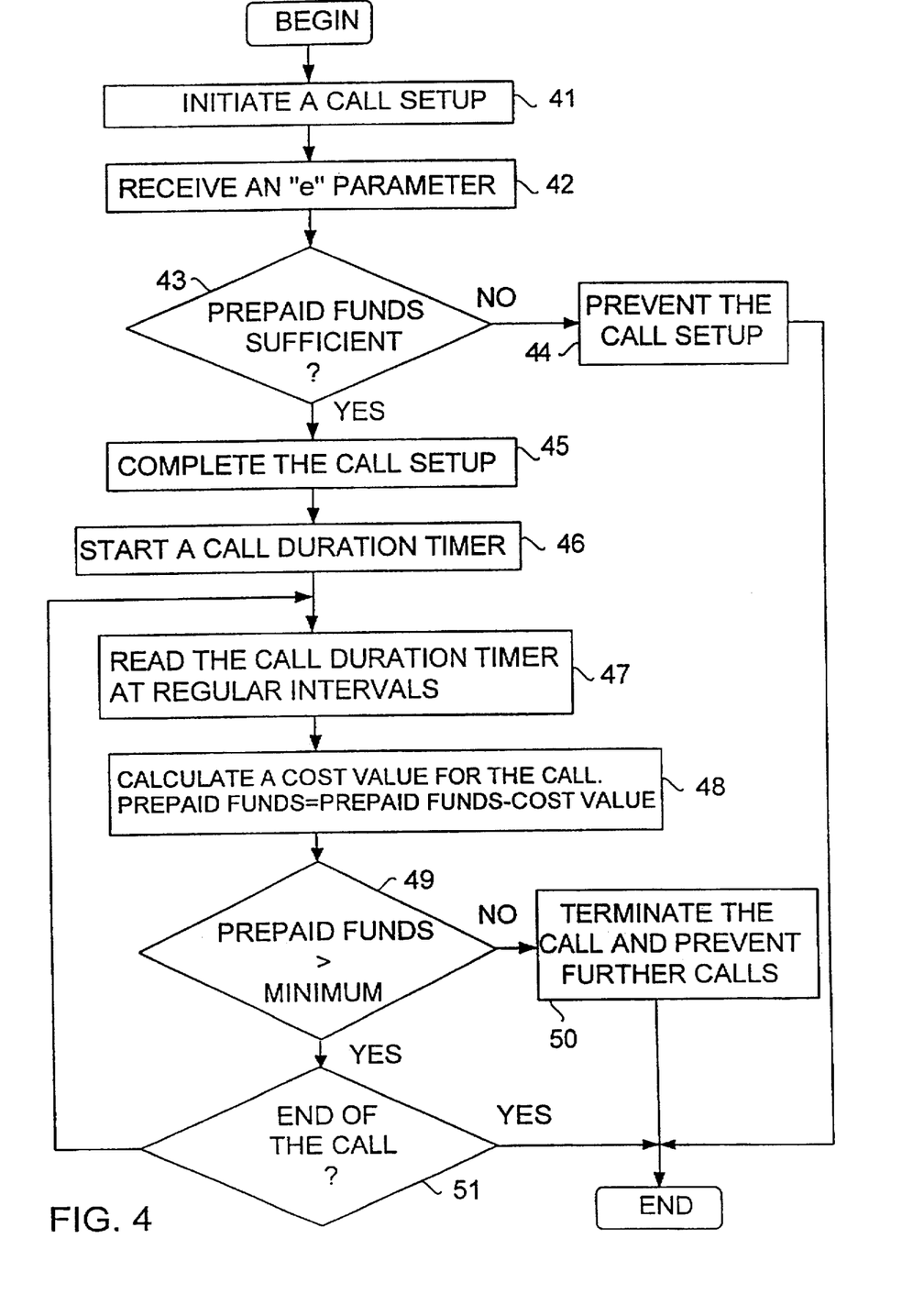
FIG. 4 is flow chart illustrating an operation of a call control according to one embodiment of the invention.

In FIG. 4 a call set-up is initiated as normally in the GSM system (step 41). One feature of the GSM system is that charging information can be transmitted to the mobile station MS during a call. This information is transmitted in an ADVICE of CHARGE (information) parameter, which is also called an "e" parameter by the GSM specifications. This advice of charge information can be shown on the display of the MS. When the "e" parameter is received (step 42) during the call set-up, the charging information is forwarded by the ME to the SIM card which will check whether the prepaid funds are sufficient for making or receiving an outgoing call or an incoming call, respectively, (step 43). When the decision in step 43 is that the prepaid funds are not sufficient for the call, the call set-up is prevented by the SIM card (step 44). The call set-up may be prevented by stopping the necessary call set-up and verification programs that are normally run by the SIM card. Such programs are e.g., authentication and ciphering algoritms A3 and A8.

When the decision in step 43 is that the prepaid funds are sufficient for making an outgoing call or receiving an incoming call, the call set-up procedure is completed (step 45) and a timer which measures the duration (elapsed time) of the call is started (step 46). This timer may be located also in the ME instead of the SIM card. At regular intervals, or alternatively at the end of the call, the call duration timer is read in order to obtain the present time value (step 47). A cost value for the elapsed time of the call is then calculated (step 48) by multiplying the value of the call duration timer by a time tarif rate. The time tarif rate, i.e. charging information, may be preprogrammed into the SIM card or sent via further "e" parameters from the network. The resulting cost value is then subtracted from the initial value of prepaid funds stored in the SIM. After subtraction, the remaining value of the prepaid funds is rewritten into the electrically alterable memory of the SIM instead of the previous value of the prepaid funds. The remaining value of the prepaid funds may be also displayed on the display of the ME.

At step 49, a check is made whether the remaining value of the prepaid funds has reached a predetermined minimum value. This minimum value will be normally set by the operator of the radio network. The prepaid funds equal to or below this minimum value does not authorize for further outgoing or incoming calls. When the decision at step 49 is that the remaining value of the prepaid funds is not higher than the minimum value, the ongoing call is terminated and further calls are prevented by the SIM card (step 50). When the decision at step 49 is that the remaining value of the prepaid funds is higher than the minimum value, a check is made whether it is the end of the call or not (step 51). If a call continues, the process proceeds back to the step 47. In case it is the end of the call, the process is ended.

Figure 5:
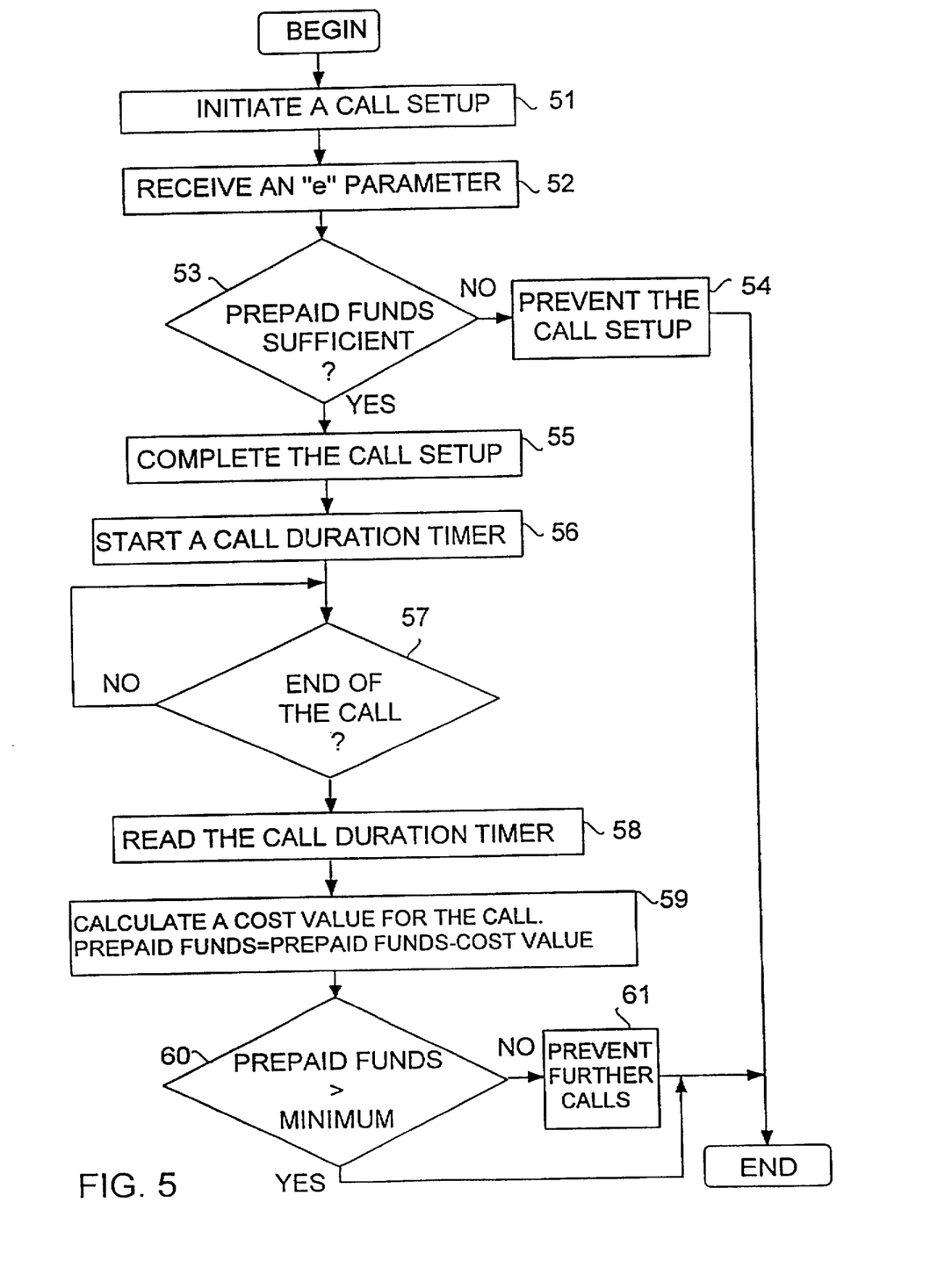
FIG. 5 is flow chart illustrating an operation of a call control according to another embodiment of the invention.

FIG. 5 is a flow chart which illustrates an operation of a SIM card when the value of the prepaid funds is monitored only at the beginning and end of the call, respectively. In FIG. 5 steps 51, 52, 53, 54, 55 and 56 are similar to the steps 41, 42, 43, 44, 45 and 46 in FIG. 4. In other words, upon an allowed call set-up, a call duration timer is started. Then, at step 57, the end of the call is awaited. At the end of the call, the call duration timer is read, a cost value for the call is calculated, and the calculated cost value is subtracted from the initial value of the prepaid funds at steps 58 and 59 in a similar manner as at steps 47 and 48 in FIG. 4, respectively. The remaining value is stored in the SIM card. When the remaining value of the prepaid funds is not higher than the minimum value, further outgoing or incoming calls are blocked by the SIM card at step 61.

Figure 6:
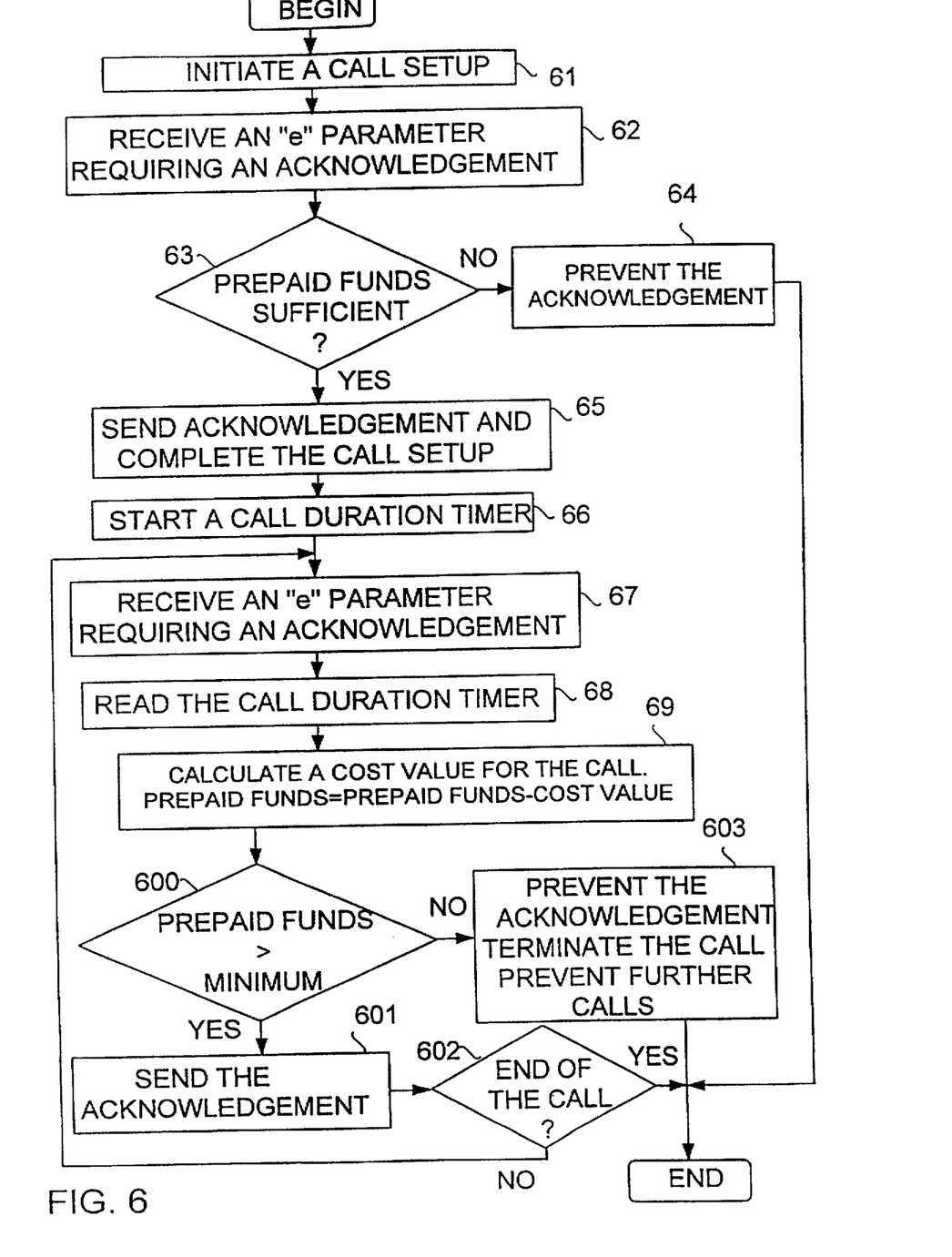
FIGS. 6, 7 and 8 are flow charts illustrating an operation of a call control according to still another embodiment of the invention.
Figure 7:
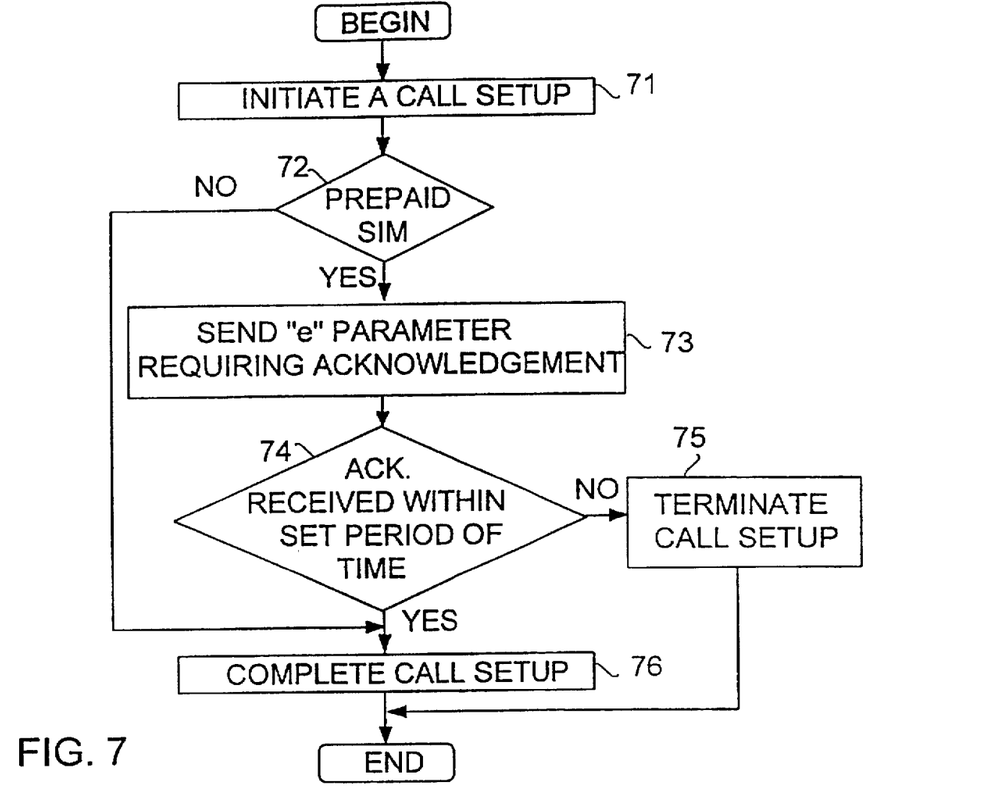
Figure 8:
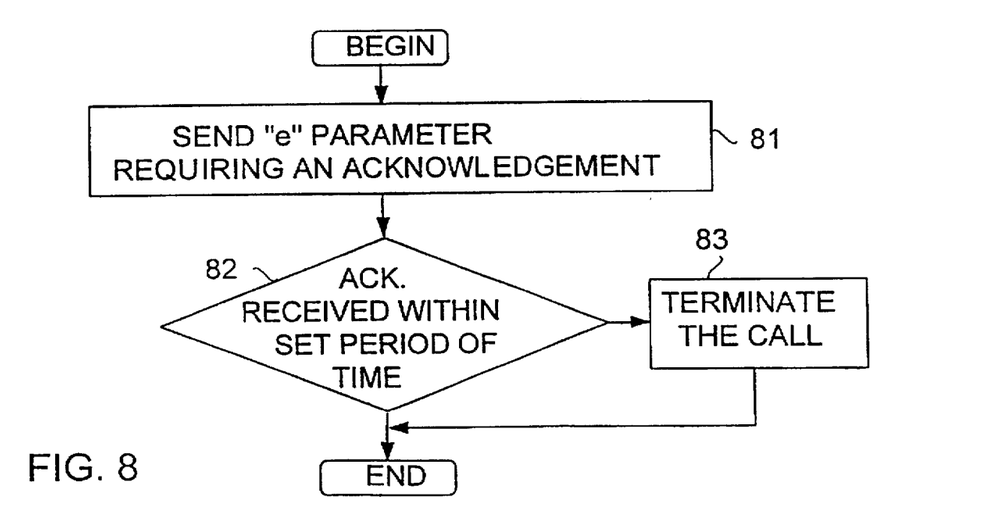

A further alternative embodiment of the call control process utilizing the prepaid SIM card according to the invention is illustrated in FIGS. 6, 7 and 8. In the FIG. 6 is shown a flow chart illustrating operation of the SIM card during a call set-up and a call. FIGS. 7 and 8 are flow charts illustrating operation of the radio network during the call set-up and the call, respectively. In this embodiment, a new "e" parameter, advice of charge (charging) is implemented in the network and in the mobile station.

Firstly, in case of an outgoing call, the mobile station MS initiates a call set-up at step 61 in FIG. 6. Consequently, the radio network initiates call set-up at step 71 in FIG. 7. Alternatively, in case of an incoming call (which will be paid by the called subscriber), the procedure begins in step 71 where the radio network iniates a call set up. During the normal call set-up procedures, the radio network determines on basis of the subscriber data stored in the network data bases that the SIM card is of a prepaid type (step 72). To that end, the subscriber data contains information of the type of the SIM cards. After noticing a prepaid SIM card, the radio network sends, instead of the normal "e" parameter, the new "e" parameter which requires acknowledgement (step 73) and waits for the acknowledgement from the MS for a set period of time.

The MS receives the "e" parameter requiring an acknowledgement at step 62, and the SIM card checks whether the prepaid funds are sufficient for the call or not (step 63). If the prepaid funds for the call are not sufficient at step 63, the SIM card prevents the acknowledgement of the "e" parameter and prevents the call set-up at step 64.

When no acknowledgement is received by the radio network within the set period of time at step 74, the radio network terminates the call set-up at step 75 in FIG. 7.

When the prepaid funds are sufficient for the call at step 63 in FIG. 6, the SIM card allows the acknowledgement of the "e" parameter and the completion of the call set-up at step 65. When the acknowledgement is received within the set period of time by the radio network at step 74 in FIG. 7, the radio network completes the call set-up at step 76.

At the beginning of the call, a call duration timer is started in the MS (step 66). During the call, the radio network sends "e" parameters regarding an acknowledgement at step 81 in FIG. 8 and waits for an acknowledgement for a set period of time at step 82. The MS receives the "e" parameter requiring an acknowledgement at step 67 in FIG. 6, and reads the call duration timer at step 68. A cost value for the call is calculated and subtracted from the initial value of the prepaid funds at step 69. When the remaining value of the prepaid funds is higher than a set minimum value at step 600, the SIM card allows the sending of the acknowledgement at step 601. Thereafter when the end of the call is not noticed at step 602, a process returns to step 67. If the end of the call is noticed, the process ends. When the radio network receives the acknowledgement within the set period of time at step 82 in FIG. 8, the radio network continues the normal call control process until it is time to send the next "e" parameter.

When the remaining value of the prepaid funds is not higher than the minimum value at step 600 in FIG. 6, the SM prevents the acknowledgement of the "e" parameter, terminates the call and prevents further calls at step 603. Similarly, when no acknowledgement is received within the set period of time by the radio network at step 82, the radio network terminates the call at step 83.

The step 72 in FIG. 7 may be omitted, so that acknowledgement of the "e" parameter is required from all types of SIM cards. However, this modification results in a huge amount of unnecessary signalling in the network, and therefore, the selective use of the new "e" parameter therewith are preferred.

The figures and the description associated is only intended to illustrated the present invention. Changes and modifications to the described embodiments are possible without going beyond the scope and spirit of the attached claims.

I claim:

1. A mobile radio system, comprising:

a network and a plurality of mobile radio terminals, each of the mobile radio terminals, each of the mobile radio terminals accommodating a removable subscriber identification module which stores data permanently related to an identification and authentication of a mobile subscriber;

said network including means for transmitting a message containing charging information via said network and requesting one of the mobile radio terminals to send an acknowledgement, said one of said radio terminals including means for receiving said message;

the respective said subscriber identification module having means for checking by the respective said subscriber identification module, of a value of prepaid funds stored in the respective said subscriber identification module, the respective said subscriber identification module including means for preventing said subscriber identification module from sending said acknowledgment in response to checking by said means for checking when said value of prepaid funds is insufficient for a call, but allowing said subscriber identification module to send said acknowledgment in response to checking by said means for checking when said value of prepaid funds is sufficient for a call, and said network including means for continuing the call by said network in response to receipt by said network of the acknowledgement, but interrupting said call by said network in response to lack of receipt by said network of the acknowledgement within a predetermined time interval.

2. A mobile radio system, comprising:

a network and mobile radio terminals, each of said mobile radio terminals having means accommodating a removable subscriber identification module which stores data permanently related to an identification and authentication of a mobile subscriber;

each said subscriber identification module including means for checking a value of prepaid funds stored in the respective said subscriber identification module;

each said subscriber identification module including means for disabling by the respective said subscriber identification module of execution of a call setup procedure in the respective one of said mobile radio terminals in which the respective said subscriber identification module is accommodated by a respective said accommodating means in response to checking by to said means for checking when said value of prepaid funds is insufficient for a call, but allowing execution of said call setup procedure in the respective said mobile radio terminal in response to checking by said means for checking when said value of prepaid funds is sufficient for a call.

3. A mobile radio terminal for a mobile radio system, comprising:

means accommodating a removable subscriber identification module which stores data permanently related to an identification and authentication of a mobile subscriber;

said subscriber identification module including means for checking a value of prepaid funds stored in said subscriber identification module;

said subscriber identification module including means for disabling by said subscriber identification module of execution of a call setup procedure in the mobile radio terminal in response to checking by said means for checking when said value of prepaid funds is insufficient for a call, but allowing execution of said call setup procedure in the mobile radio terminal in response to checking by said means for checking when said value of prepaid funds is sufficient for a call.

4. A removable subscriber identification module for a mobile radio terminal, comprising:

means storing data permanently related to an identification and authentication of a mobile subscriber;

means for checking a value of a prepaid funds stored in said subscriber identification module;

means for disabling by said subscriber identification module of execution of a call setup procedure in a mobile radio terminal which accommodates said subscriber identification module, in response to checking by said means for checking when said value of prepaid funds is insufficient for a call, but allowing execution of said call setup procedure in the said mobile radio terminal in response to checking by said means for checking when said value of prepaid funds is sufficient for a call.

5. A mobile radio terminal in a mobile radio network arranged to transmit a message containing charging information and requesting of said mobile radio terminal to send an acknowledgement in order to continue a call, said mobile radio terminal comprising a removable subscriber identification module which stores data permanently related to an identification and authentication of a mobile subscriber;

means for receiving said message;

said subscriber identification module having means for checking by said subscriber identification module, or a value of prepaid funds stored in said subscriber identification module, said subscriber identification module including means for preventing said subscriber identification module from sending, via said mobile radio terminal, said acknowledgement in response to checking by said means for checking when said value of prepaid funds is insufficient for a call, but allowing said subscriber identification module to send the acknowledgement in response to checking by said means for checking when said value of prepaid funds is sufficient for a call.

6. A removable subscriber identification module for a mobile radio terminal in a mobile radio network arranged to transmit a message containing charging information via said network and requesting said mobile radio terminal to send an acknowledgement in order to continue a call, said removable subscriber identification module comprising means for storing data permanently related to an identification and authentication of a mobile subscriber;

means for checking by said subscriber identification module of a value of prepaid funds stored in said subscriber identification module, means for preventing said subscriber identification module from sending said acknowledgement in response to checking by said made for checking when said value of prepaid funds is insufficient for a call, but allowing said subscriber identification module to send said acknowledgement in response to checking by said means for checking when said value of prepaid funds is sufficient for a call.

* * * * *